United States Patent [19]

Fuchs et al.

[11] Patent Number: 4,497,475
[45] Date of Patent: Feb. 5, 1985

[54] NOZZLE ASSEMBLY FOR A METALLURGICAL FURNACE

[75] Inventors: Gerhard Fuchs, Kehl-Bodersweier; Ernst Wabersich, Kehl-Marlen, both of Fed. Rep. of Germany

[73] Assignee: Korf & Fuchs Systemtechnik GmbH, Fed. Rep. of Germany

[21] Appl. No.: 560,510

[22] Filed: Dec. 12, 1983

[30] Foreign Application Priority Data

Jan. 18, 1983 [DE] Fed. Rep. of Germany ....... 3301466

[51] Int. Cl.³ .............................................. C21B 7/16
[52] U.S. Cl. ..................................... 266/270; 239/114
[58] Field of Search ............. 266/222, 223, 225, 265, 266/266, 267, 268, 270; 239/114, 115, 116, 117, 118, 123

[56] References Cited

U.S. PATENT DOCUMENTS

| 294,684 | 3/1884 | Schulze-Berge | 266/223 |
| 1,647,052 | 10/1927 | Osolin | 266/265 |
| 1,835,838 | 12/1931 | Anderson, Jr. | 266/265 |

OTHER PUBLICATIONS

Newton, "Extractive Metallurgy", John Wiley and Sons Inc. 1959, pp. 260–263.

Primary Examiner—L. Dewayne Rutledge
Assistant Examiner—Robert L. McDowell

[57] ABSTRACT

A nozzle assembly constituting a burner or blowing nozzle includes, in the region of the discharge opening thereof, a piston-like member which is displaceable by an actuating means into a position of blocking off the discharge opening thereby to prevent same from becoming clogged by slag or metal splashed thereon. When the assembly is mounted in the wall of a metallurgical furnace, the piston-like member may also be adapted to close off the opening in the wall, which communicates with the nozzle assembly, in order also to keep the wall opening open. At least a part of the piston-like member may be caused to oscillate or at least the part thereof which is towards the interior of the furnace may comprise or be coated with a scale-resistant material or may be coated with a material that is difficult to wet.

13 Claims, 5 Drawing Figures

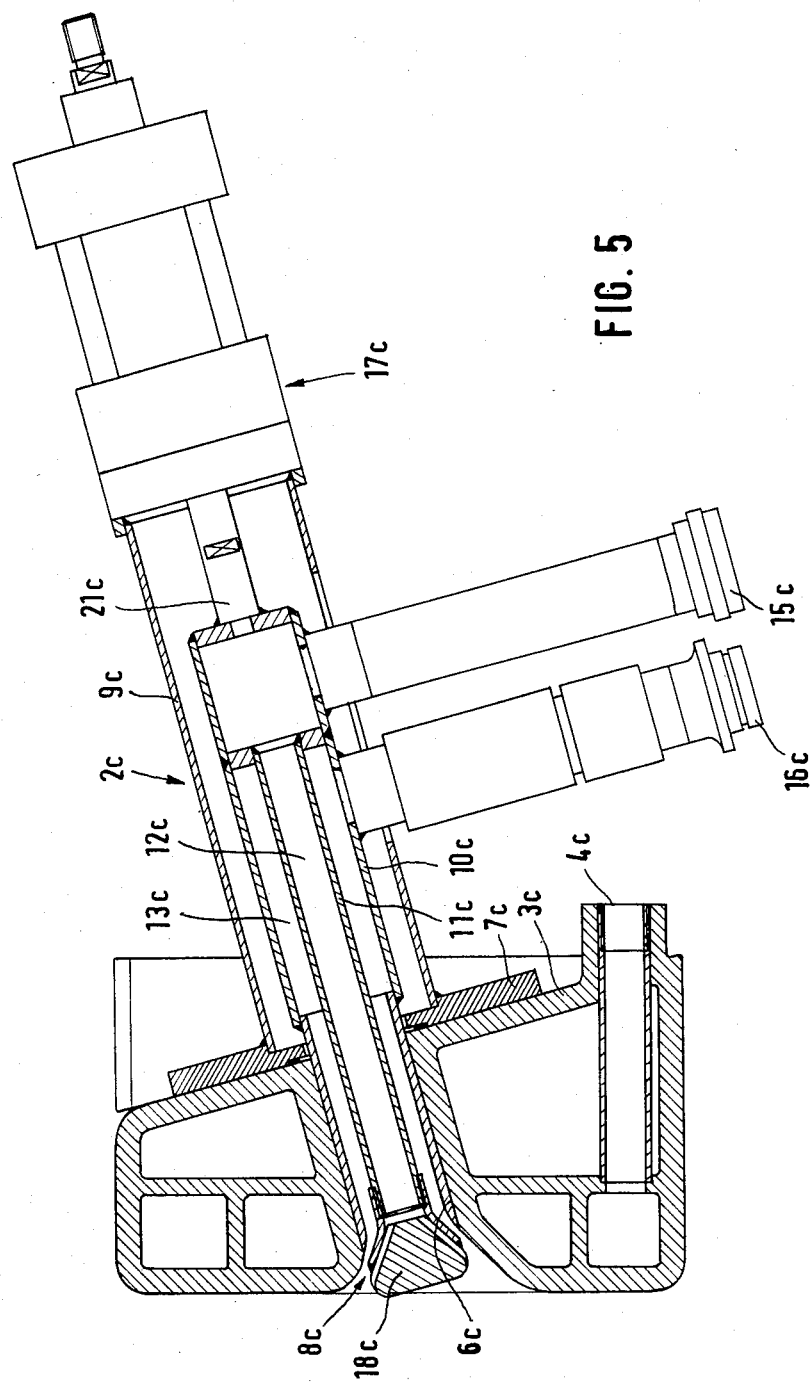

NOZZLE ASSEMBLY FOR A METALLURGICAL FURNACE

BACKGROUND OF THE INVENTION

The invention relates generally to an arrangement which is variously known as a burner or jet, or blowing nozzle, for example for use in a metallurgical furnace, for injecting for example a fuel such as a fuel gas and one or more other gases, into the interior of the furnace. For the sake of simplicity of terminology in this specification, the term nozzle or nozzle assembly will be used to denote a burner or blowing nozzle.

German published specification (DE-AS) No 20 13 145 discloses a nozzle assembly for use in a metallurgical furnace such as an arc furnace, which in use is disposed above the level of the molten bath in the furnace. In the region of the tip of the nozzle assembly, that is to say, in the region of the discharge opening thereof, that arrangement has a change-over slide member which is displaceable by pneumatic or hydraulic means, for controlling the feed of fuel gas and one or more other gases to the discharge opening of the nozzle assembly.

When using nozzle assemblies which are sometimes referred to as jet burners for oil and oxygen or fuel gas and oxygen, in a metallurgical furnace, more specifically an electric arc furnace, the mouth opening of the nozzle assembly must be kept free of metal and slag which may be deposited in that area of the nozzle assembly as by splashing. The danger of the discharge opening of the nozzle assembly becoming fouled by slag or the like is very serious in particular during the periods of time when the nozzle assembly is not operating. Similar problems also occur in regard to nozzle assemblies forming blast nozzles for injecting oxygen or an oxygen-bearing gas into a furnace.

In order to avoid fouling and corrosion due to the deposit of slag on the burner arrangement, the burner arrangement must be drawn or pivoted out of its position in the wall of the furnace during the periods of time that the assembly is not operative, by using mechanical means. Such withdrawal means are expensive and also susceptible to breakdown or failure. They also require a large amount of maintenance. Furthermore, before the burner arrangement is refitted into position in the opening in the wall of the furnace, that opening must be properly checked and if necessary any slag deposited in that area must be removed.

Another method of keeping the mouth of the burner arrangement free involves blowing air through the burner during the periods when the burner is not in operation. The effectiveness of that mode of procedure is doubtful particularly when the burner is disposed in the wall of the furnace at a very low position, when slag reaches the openings. In addition, the costs involved in producing the flow of compressed air are high.

SUMMARY OF THE INVENTION

An object of the present invention is to provide a new and improved burner or blow nozzle assembly for use in a metallurgical furnace.

Another object of the present invention is to provide a burner or nozzle assembly for a metallurgical furnace, such as to at least substantially reduce the accumulation of metal and/or slag at the discharge opening of the assembly or at the opening in the wall of the furnace which receives same.

Still another object of the present invention is to provide a burner or nozzle assembly with means adapted to remove spatter or splash of metal and/or slag on the assembly at or around the discharge opening thereof or at or around the opening through the wall of the furnace for receiving the burner or blow nozzle.

Yet another object of the present invention is to provide a burner or blow nozzle assembly which can be cleaned off in respect of metal or slag thereon, without removing or dismantling the burner or blow nozzle.

Yet a further object of the present invention is to provide a burner or blow nozzle for use in a metallurgical furnace, wherein spatters of metal or slag thereon can be readily removed by mechanical means and without the use of for example compressed air.

A still further object of the present invention is to provide a burner or blow nozzle which can be fixedly installed in the wall of a furnace in a low position, without operation of the burner or nozzle being disturbed by metal or slag adhering thereto in the region of its tip.

In accordance with the present invention, these and other objects are achieved by a burner or nozzle assembly for use in a metallurgical furnace such as an electric arc furnace, at a position above the level of the molten bath therein. The assembly comprises an injection duct or passage leading to a discharge opening for injecting for example oxygen or oxygen-bearing gas or fuel into the furnace. Disposed in the region of the discharge opening of the duct or passage and displaceable by means of an actuating means is a closure member which may be for example in the form of a piston. The closure member is thus adapted to be displaced by the actuating means into a closure position in which it blocks off the discharge opening.

When the assembly is fitted into the wall of a metallurgical furnace, above the level of the molten bath therein, with the wall having an opening which adjoins or is aligned with the discharge opening of the assembly, for the material injected by the assembly to pass through the wall opening into the furnace, the closure member may also be such that it can be displaced to a position in which it also closes or blocks off the opening in the wall of the furnace.

Therefore, it will be seen that, in the nozzle assembly according to the principles of the present invention, the discharge opening thereof, or also the opening in the wall of the furnace in which the nozzle assembly is fitted, can be closed off by means of the displaceable piston-like member. By virtue of the discharge opening being closed off in that way, during the periods when the nozzle assembly is not in operation, splashes of metal and/or slag can no longer penetrate into the mouth opening of the nozzle assembly and give rise to failures or interruptions in operation, but instead, such splashes impinge on the closure member in its position of closing off the discharge opening of the nozzle assembly and/or the opening in the wall of the furnace. In its region which is towards the interior of the furnace, the closure member is formed of scale-resistant material and is possibly coated with a material which is difficult to wet such as graphite, in order to make it difficult for splashes of metal and/or slag to adhere to the closure member. Preferably however, the piston-like closure member is also caused to oscillate in the region thereof which is towards the interior of the furnace, thereby to remove any splashes which may impinge thereon, as soon as they occur. In a particular form of that construction, when the closure member is of a piston-like configuration which is displaceable parallel to the longitudinal centre line of the burner or nozzle, longitudinal oscillations are particularly suitable for removing slag or metal. However, it is also possible to use transverse oscillations or mixed oscillations.

In an embodiment of the arrangement according to the present invention, the entire closure member may be caused to oscillate, in which case a mechanical oscillation generator, an electromechanical oscillator generator or a hydraulically or pneumatically actuated oscillation generator may be used to produce the oscillations. However, it will be appeciated that the important consideration is for the surface of the closure member on which the splashes of metal and/or slag may be deposited to be set oscillating. It is therefore sufficient for that surface portion to be caused to oscillate. That is a particularly important consideration when using ultrasonic oscillation generators in which the location of the amplitudes of the oscillations produced, within the closure member, is influenced by the configuration of the closure member. The oscillation amplitude should occur in the region of the surface on which the splashes of metal and/or slag impinge. Therefore, the shape and the distribution of mass of the closure member should desirably be such as to optimise the oscillation or sound field magnitude, in other words, the natural frequency of the piston-like member and the modes of oscillation within that member should be matched to the frequency of the oscillation generator.

Preferably, the displaceable piston-like member and the oscillation generator are matched to each other, in respect of design configuration and frequency, in particular to the sound and ultrasonic wave range, in such a way that sound waves or ultrasonic waves are irradiated from the surface of the closure member at such a high energy level that slag in the space in front of the closure member, in the direction of the interior of the furnace, is caused to oscillate to such an extent that it is thrown off or broken up.

The effect of removing particles of slag which adhere to the arrangement, or a layer of adhering slag in the region of or in front of the mouth opening of the nozzle assembly may also be achieved, possibly in combination with the generation of sound waves or ultrasonic waves, by the displaceable closure member being extended beyond the mouth opening of the nozzle assembly, by the means provided for actuating the displaceable closure member. During that thrust movement of the closure member inwardly of the furnace, any particles of metal or slag adhering to the nozzle assembly are mechanically removed, while if there is a layer of slag on the assembly, the closure member is pushed through that layer and thus causes it to be broken up and removed. In that case, the displaceable member acts in the manner of a ramming element or broaching tool for removing any foreign particles adhering to the nozzle assembly or the opening in the wall of the furnace in which the nozzle assembly is disposed. The removal operation by means of the broaching tool or ramming member may be carried out in each break in operation of the nozzle assembly automatically or in a controlled manner during operation of the assembly.

Further objects, features and advantages of the arrangement in accordance with the present invention will be more clearly apparent from the following detailed description of preferred embodiments thereof.

BRIEF DESCRIPTION OF THE DRAWINGS

FIG. 5 shows the arrangement of a nozzle assembly in the side wall of a metallurgical furnace, in which closure of the opening in the wall of the furnace is effected in the reverse direction to that used in the embodiments shown in FIGS. 1 through 4.

DESCRIPTION OF PREFERRED EMBODIMENTS

Figure 1:
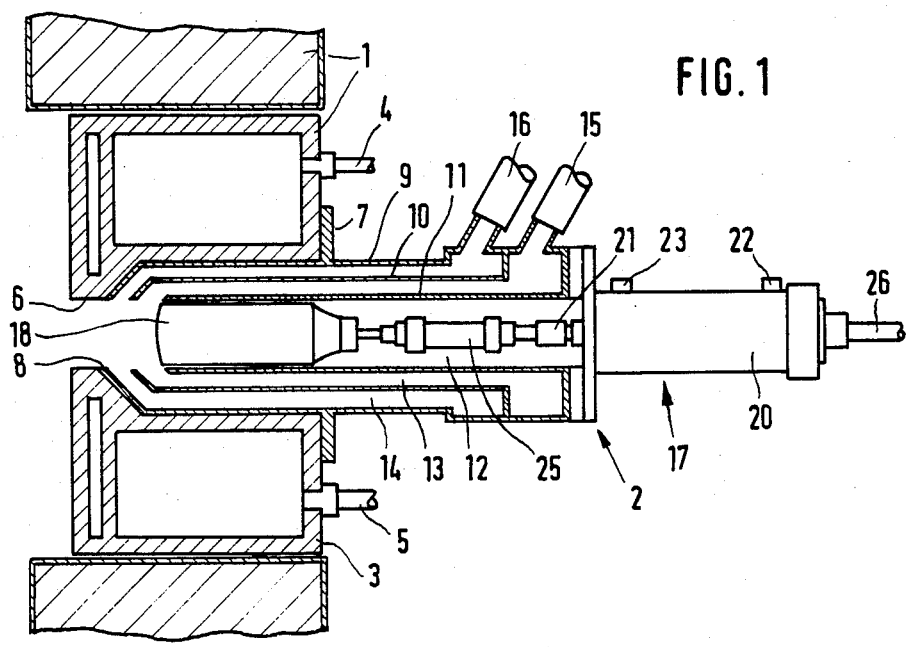
FIG. 1 is a diagrammatic side view in partial cross-section of a nozzle assembly such as a burner disposed in the side wall of a metallurgical furnace, in the operative condition of the nozzle assembly.

Referring firstly to FIG. 1, shown therein is a side wall structure 1 of a metallurgical furnace such as for example a Siemens Martin furnace, a converter, a melting gasifier, an electric arc furnace or the like, and a nozzle assembly indicated generally by reference numeral 2, such as a burner or blow nozzle, which is disposed in the side wall 1 of the furnace at such a position that it is above the level of the molten bath in the furnace. In the construction shown in FIG. 1, the nozzle assembly 2 is carried in a water cooling box 3 which in turn is fitted into the refractory lining of the furnace. Reference numeral 4 denotes the water feed for the water cooling box 3, while reference numeral 5 denotes the water return or discharge. The water cooling box 3 forms a part of the wall 1 of the metallurgical furnace and has an opening 6 through which the fuel mixture or the gases are discharged from the nozzle assembly 2 into the interior of the furnace. The nozzle assembly 2 is secured to the water cooling box 3 by means of a flange 7 in such a way that a discharge opening 8 of the nozzle assembly 2 is disposed directly adjoining the opening 6 in the wall 1. In the present case, the discharge opening 8 is of the same cross-section as the wall opening 6.

As can be seen from FIG. 1, the nozzle assembly or burner 2 illustrated therein comprises three concentric pipes 9, 10 and 11, thereby forming a central duct or passage 12 and first and second annular passages or ducts 13 and 14 which are disposed therearound. A fuel such as a fuel gas can be fed to the inner annular duct 13 by way of a feed connection 15 and an oxygen-bearing gas such as oxygen can be fed to the outer annular duct 14 by way of a feed connection 16. In the case of a known burner, the central duct 12 is usually also used for a feed of fuel gas or oxygen, while, in the case of a known blowing nozzle, oxygen is generally introduced through the central duct 12; a protective fluid is introduced through the annular ducts 13 and 14. In the nozzle assembly of the invention however, the duct 12 serves a different purpose, as will be described below.

In the construction illustrated in FIG. 1, associated with the nozzle 2 is a displaceable closure member 18 which is operatively connected to a suitable actuating means indicated generally by reference numeral 17, for displacing the member 18 in the lengthwise direction of the assembly 2. As will be clearly seen from FIG. 1, the member 18 is of a generally piston-like configuration and is disposed axially displaceably in the central duct 12 of the assembly 2. The cross-section of the central duct 12 approximately corresponds to the discharge opening 8 and the wall opening 6. The member 18 can be displaced by the actuating means 17 from the retracted or inoperative position shown in FIG. 1, into the first, extended position shown in solid lines in FIG. 2 and indicated by reference numeral 24, or into a second, further inwardly extended position shown by broken lines in FIG. 2 and indicated by reference numeral 19. In both the positions 19 and 24 shown in FIG. 2, the member 18 closes off the wall opening 6 and thus prevents splashes or spatter of metal or slag from being deposited in and adhering within the opening 6 in the wall 1 of the furnace. Any metal or slag which is already adhering to the structure in the opening 6 in the wall of the furnace is removed when the piston-like closure member 18 is extended from the retracted or inoperative position shown in FIG. 1 into the closure position shown in FIG. 2, as the external cross-section of the member 18 at its end at least substantially corresponds to the cross-section of the wall opening 6. It should be noted at this point however that the purpose of the member 18 is not to interrupt or cut off the supply of fuel or gas from the burner, that cut-off effect being produced by valves (not shown) in the conduits connecting to the connecting means 15 and 16. The purpose of the member 18 is to fill up the opening 6 in the wall of the furnace, in other words, to block up the opening 6 so as to prevent it from being accessible from the interior of the furnace, and to remove any slag or metal which has already been deposited in the wall opening 6 during the forward movement of the piston-like member 18, when it acts in the manner of a broaching tool. Any particles or pieces of slag or a layer of slag in front of the wall opening 6 can also be removed or pierced by the closure member 18 being extended further into the interior of the furnace, being the position indicated in broken lines at 19 in FIG. 2.

Figure 2:
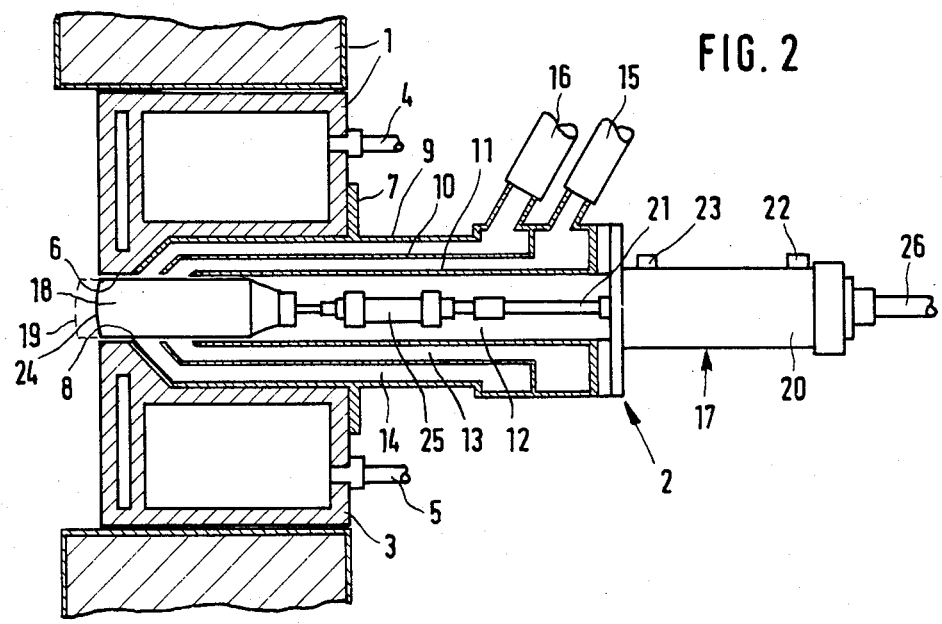
FIG. 2 shows the nozzle assembly of FIG. 1 but in the condition thereof that is assumed during a break in operation of the nozzle assembly.

It will be noted that, in the construction shown in FIGS. 1 and 2, the two annular ducts 13 and 14 communicate with the central duct 12 upstream (in relation to the flow through the nozzle assembly) of the discharge opening 8 of the burner 2. By virtue of that arrangement, the respective discharge openings of the annular ducts 13 and 14 are brought together to form a single discharge opening 8 for the burner, and that discharge opening 8, like the wall opening 6, is closed when the closure member 18 is in the closed position. A design configuration of that kind appears to be desirable particularly when the mouth of the burner assembly 2 is directly exposed to the atmosphere within the furnace, so that the discharge opening 8 of the nozzle assembly 2 does not have a wall opening 6 of a water cooling box or the like, adjacent thereto, which would otherwise provide some measure of protection for the discharge opening 8 of the nozzle assembly.

In the embodiment illustrated in FIGS. 1 and 2, the actuating means 17 for displacing the piston-like member 18 lengthwise of the nozzle assembly 2 is in the form of a pneumatic double-acting thrust drive means, in other words, it causes the member 18 to be positively displaced both in its direction of extension and in its direction of retraction. For that purpose, disposed movably within a pneumatic cylinder unit 20 is a piston (not shown) which is connected to the member 18 by a piston rod 21. The pneumatic cylinder unit 20 has compressed air connections 22 and 23 which communicate with the interior of the pneumatic cylinder unit 20 on different sides of the piston therein. By virtue of this arrangement, the piston of the piston-cylinder unit 20 and thus the member 18 can be reciprocated between the positions shown in FIGS. 1 and 2 respectively. The further extended position 19 shown in broken lines in FIG. 2 may be provided either as an alternative to or in addition to the position indicated at 24 in solid lines. The pneumatic cylinder unit 20 should be of such a size that, when the member 18 is extended from the retracted position of FIG. 1 into the closure position of FIG. 2, any metal or slag clinging to the arrangement is pushed off by the member 18, acting in the manner of a ramming tool, while when the member 18 is moved into the further extended position 19, it can pierce and thus break up any layer of slag which has been formed in front of the opening 6 in the wall of the furnace.

As, when the member 18 is in the closure position, a part of the surface thereof is exposed to the effect of splashes and spatters of metal and/or slag, it is advantageous to take steps to ensure that it is more difficult for such material to adhere to the member 18 in that part of its surface. In accordance with a preferred aspect of the invention, that is achieved in that the respective part of the member 18, that is to say, the surface thereof which, in the closure position of the member 18, is exposed to the possible effect of splashing of metal and/or slag, is set oscillating by means of an oscillation generator indicated diagrammatically by reference numeral 25. The surface of the member 18 which is directed inwardly of the furnace can be substantially or entirely kept free of slag or metal, by virtue of the form of oscillation and the frequency employed. Alternatively, or in order further to enhance that effect, the appropriate surface portion of the member 18 may also be made from or covered with a highly heat-resistant, scale-resistant material. That surface portion of the member 18 is deliberately not cooled so that it is heated up by the heat of the furnace to a high temperature, because at higher temperatures the slag runs off the member 18 more easily, by virtue of its viscosity being lower, or can be more easily thrown off the surface of the member 18 by virtue of the oscillation movement thereof. Suitable scale-resistant materials include chromium nickel steels, nickel alloys, ceramic materials or graphite. It is also advantageous for the surface of the member 18 which may be exposed to the effect of splashing of metal and/or slag to be coated with a material which is difficult to wet. Graphite is particularly suitable for that purpose. If there is a fear of possible overheating of the member 18, it may be desirable for the member 18 to be suitably cooled.

In the embodiment shown in FIGS. 1 and 2, the oscillation generator 25 is in the form of a pneumatic oscillation generator which, in this embodiment, operates at a frequency of 1 Hz, thereby causing the member 18 to oscillate axially with a stroke length of 15 mm. The piston rod 21 is of a hollow configuration so that the oscillation generator 25 can be supplied with the compressed air required for producing the oscillator movement. The central duct or passage of the piston rod 21 communicates with a connection 26 for the feed of compressed air.

The above-described burner assembly operates in the following manner:

During an interruption in the operation of the burner, the feed of fuel gas and oxygen to the connections 15 and 16 is interrupted, and the member 18 is in the position 24 shown in FIG. 2. It performs axial oscillatory movements about that position, which are produced by the pneumatic oscillation generator 25 which in turn is supplied with compressed air in a pulsating mode by way of the connection 2. When the burner assembly is set in operation, fuel gas and oxygen are supplied by way of the connections 15 and 16, and at the same time the pneumatic actuating means 17 is operated to retract the member 18 into the position shown in FIG. 1. The feed of compressed air to the oscillation generator 25 is also interrupted. Due to the high speed of the fuel gas oxygen mixture which issues from the mouth opening of the burner during operation thereof, the mouth opening is kept substantially free and open. If however particles or pieces of metal and/or slag should be deposited on and cling to the structure in the region of the wall opening 6 during operation of the burner, then such metal or slag may be removed again by the member 18 which acts as a ramming tool, when the member 18 is pushed into the extended position shown in FIG. 2, by the pneumatic thrust means 17. That operation is performed at the end of the period of operation of the burner assembly. However, such a displacement of the member 18 may also be produced during operation of the burner, in order to clean the discharge opening, but in that case the feed of fuel gases must be interrupted for the period of time for which the member 18 is in the advanced or extended position.

Particularly in operation of an electric arc furnace, it may occur that, during a break in operation of the burner, a larger amount of slag may splash or slop in front of the burner opening, that is to say, in the illustrated structure, in front of the wall opening 6. In that case, the opening may be closed off by a layer of slag which is of a generally bell-shaped configuration. The layer of slag formed in that way may be broken down and the opening 6 exposed again, by the member 18 being pushed out into the further inwardly extended position shown in broken lines at 19 in FIG. 2, by operation of the pneumatic actuating means. Another method of clearing the opening 6 in such a situation is for the layer of slag to be subjected to the action of a sound or ultrasonic oscillation so as to cause it to collapse. That may be achieved for example by means of the burner construction illustrated in FIG. 4, to which further reference will be made below.

Figure 3:
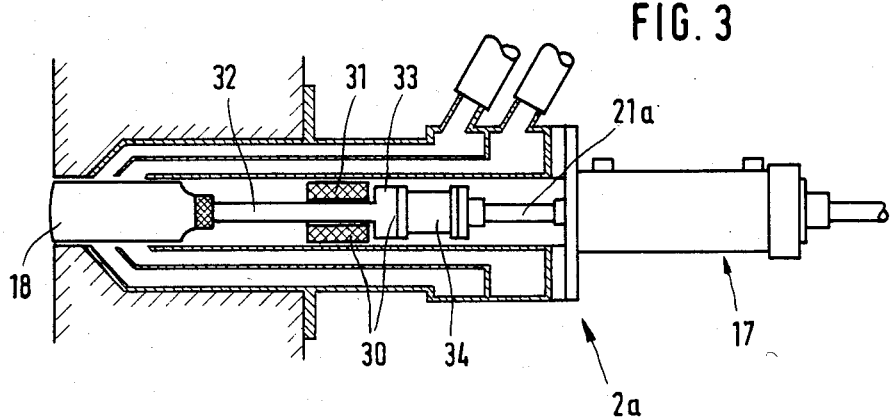
FIG. 3 is a view similar to that shown in FIG. 2 of a second embodiment of a nozzle assembly such as a burner which has an electromagnetic oscillation generator instead of a hydraulic oscillation generator.
Figure 4:
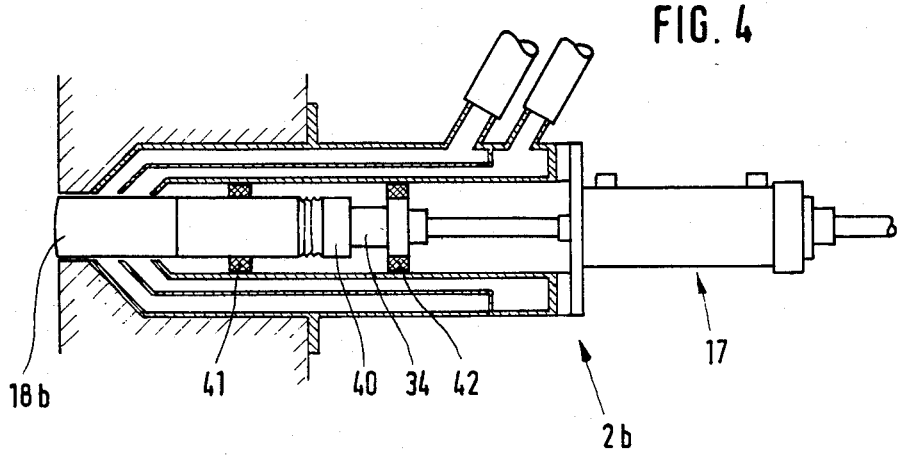
FIG. 4 is another view similar to that shown in FIG. 2 but showing a third embodiment using an ultrasonic oscillation generator.

Referring now generally to FIGS. 3 and 4, the nozzle assembly constructions illustrated therein differ from the construction shown in FIGS. 1 and 2, by virtue of the oscillation generator used in each of the constructions of FIGS. 3 and 4 being of a different kind. Thus, in the embodiment shown in FIG. 3, the fluid-operated oscillation generator 25 used in the embodiment of FIGS. 1 and 2 has been replaced by an electromagnetic oscillation generator 30. As will be seen from FIG. 3, secured in position within the central duct 12 of the nozzle assembly or burner 2a is a coil 31 with a connecting rod 32 extending therethrough, to the member 18. The connecting rod 32 has an armature 33 on the side of the coil 31 which is towards the actuating means 17. The armature 33 is connected to the piston rod 21a of the actuating means 17 by way of a resilient coupling 34. When the member 18 is in the closure position shown in FIG. 3, the armature 33 is disposed in the vicinity of the end of the coil 31 so that, when the coil 31 is supplied with alternating current, the armature 33 can be caused to oscillate, by magnetic attraction. The oscillatory movement is transmitted to the member 18, in the form of axial oscillations, and is substantially decoupled from the actuating means 17 by the resilient coupling 34. By virtue of the components which are to be caused to oscillate being of a suitable shape and mass distribution, it is possible for those components to be caused to oscillate in a resonance condition, at the required frequency. An important consideration in that respect is that the maximum oscillation amplitude should occur at the surface of the member 18, that is exposed to the atmosphere inside the furnace. However, the member 18 can also be caused to oscillate at a frequency other than its resonance frequency. When using an electromagnetic oscillation generator, it is desirable to make use of the mains frequency available, that is to say, the member 18 should desirably be oscillated at a frequency of 60 or 120 Hz.

In the case of the nozzle assembly or burner 2 shown in FIG. 4, the oscillation generator provided for oscillating the member 18 is in the form of an ultrasonic oscillator 40 which may be for example a quartz oscillator. The oscillator 40 causes the member 18b to oscillate in a longitudinal oscillation mode. An annular bearing member 41 is provided at the location of an oscillation node. In this construction also, the shape and mass distribution of the components to be oscillated are such that a maximum oscillation amplitude occurs at the surface of the member 18b which is towards the interior of the furnace. That oscillating surface acts at the same time as an ultrasonic emitter. Any layer of slag which is disposed in front of the oscillating member is caused to oscillate by the energy emitted by the oscillation generator, and is thus caused to break up. As in the case of the embodiment shown in FIG. 3, the oscillator in the FIG. 4 construction is decoupled from the actuating means 17 by a resilient coupling 34. Reference numeral 42 denotes a slide bearing ring for defining the position of the axially displaceable member 18b, in conjunction with the annular bearing member 41.

Reference will now be made to FIG. 5 showing an embodiment of the burner, indicated generally at 2c, in the form that is sometimes referred to as a trumpet-type burner. Such a burner construction is used when a wide but less deep region is to be heated. The burner assembly 2c is secured by means of a flange 7c to a water cooling box 3c which in turn is fitted into the side wall of a metallurgical furnace. The water cooling box 3c has a water feed connection 4c.

In the embodiment illustrated in FIG. 5, the axis or centre line of the nozzle assembly 2c is inclined downwardly, in a direction inwardly of the furnace. The nozzle assembly 2c in this embodiment also is formed by three concentric pipes 9c, 10c and 11c, the outer pipe 9c in this embodiment performing the function of supporting the actuating means 17c for the member 18c which is disposed displaceably within the end of the nozzle assembly. The concentric pipes 10c and 11c define a central duct or passage 12c, for example for the feed of fuel gas, and an annular passage or duct 13c, for example for the feed of oxygen. The connections 15c and 16c for fuel gas and oxygen communicate with the central duct 12c and the annular duct 13c respectively.

Unlike the embodiments described with reference to FIGS. 1 through 4, in this embodiment it is not just the member 18c which is axially displaceable within the burner assembly, but rather the concentric pipes 10c and 11c are axially displaceable, together with the closure member 18c. The member 18c in the illustrated embodiment is of such a configuration that it spreads out the gas flowing therepast. The member 18c is fixed to the inner pipe 11c as by screwing while the inner pipe 11c is in turn fixed to the middle pipe 10c. The pipes 11c and 10c, together with the member 18c and the pipe connections 15c and 16c, are axially displaceable by means of the actuating rod 21c, by suitable operation of the actuating means 17c, more particularly, from the position shown in FIG. 5 towards the right therein until the member 18c closes off the wall opening 6c and thus protects the discharge opening 8c for the fuel gas and oxygen, from slag and/or metal. It should be clear from this embodiment which is illustrated by way of example that many modifications and alterations may be made without departing from the scope of the invention.

Although the above-described arrangements according to the invention were described with reference to nozzle assemblies or burners in which the fuel used is a fuel gas, it should be appreciated that the principles of the present invention can also be used in regard to nozzle assemblies which operate with a liquid fuel such as oil or a solid fuel in finely divided form, in suspension in a carrier gas. Oxygen-bearing gases such as air may be used in place of oxygen.

It will be seen therefore that the above-described burner or blowing nozzle for use in a metallurgical furnace can at least substantially reduce or remove any metal and/or slag that may accumulate at the discharge opening thereof, or at the opening in the wall of the furnace at which the nozzle assembly is disposed. Such accumulation of metal or slag may thus be removed, without the need to remove the nozzle assembly from the position of installation thereof, or without other dismantling of the nozzle assembly. The accumulated metal or slag is readily removed by a mechanical action, that is to say, by being engaged by the member 18, and is thus positively cleared away.

As mentioned, it will be appreciated that many other modifications and alterations may be made in the above-described assemblies, without thereby departing from the spirit and scope of the present invention.

What is claimed:

1. A nozzle assembly for use in a metallurgical furnace above the level of the molten bath therein, comprising a duct having a discharge opening, a member which is disposed displaceably in the region of said discharge opening and which is displaceable into a position of closing said discharge opening, an actuating means for displacing said member into said closure position, and oscillation generating means operable to cause oscillation of at least a part of said displaceable member which is operative to close said discharge opening in the closure position of said displaceable member.

2. An assembly as set forth in claim 1 wherein said displaceable member comprises a cylindrical piston.

3. An assembly as set forth in claim 1 wherein said oscillation generating means comprises an ultrasonic oscillation generator.

4. An assembly as set forth in claim 1 wherein said oscillation generating means comprises an electromagnetic oscillation generator.

5. An assembly as set forth in claim 1 wherein said oscillation generating means comprises a mechanical oscillation generator.

6. A nozzle assembly for use in a metallurgical furnace above the level of the molten bath therein, comprising an array of at least a first tube means defining a central duct having a discharge opening and a second tube means defining at least one annular duct around said control duct for the feed of a material into said furnace, a piston means disposed displaceably in said central duct in the region of said discharge opening and which is displaceable into a position of closing said discharge opening, and a pusher drive means operatively connected to said piston means for displacing said piston means into said closure position.

7. An assembly as set forth in claim 6 wherein said at least one annular duct opens into said central duct at the discharge end of the assembly.

8. A nozzle assembly for use in a metallurgical furnace at a position above the level of a molten bath therein, comprising: at least one duct for carrying a flow of material to be injected into said furnace having a discharge opening for discharge of said material from said duct; means communicating with said at least one duct for introducing said material thereinto for discharge therefrom; a closure member disposed in operative association with said discharge opening such that said closure member is displaceable between an operative position of masking said discharge opening to prevent material out of said furnace from being deposited at said discharge opening and an inoperative position in which said closure member is retracted from the region of said discharge opening; an actuating means for displacing said closure member from said inoperative position into said operative position; and means for producing oscillations of said closure member at least when said closure member is in said operative position.

9. An assembly as set forth in claim 8 wherein said oscillation generating means comprises an ultrasonic oscillation generator.

10. A nozzle assembly for use in a metallurgical furnace at a position above the level of a molten bath therein, comprising: means defining an elongate chamber having an open end towards the interior of said furnace; means defining a first duct disposed in coaxial relationship around said chamber and having a discharge opening adjacent said open end of said chamber; means defining a second duct disposed in coaxial relationship around said first duct and having a discharge opening adjacent said discharge opening of said first duct; respective means for a feed of materials into said first and second ducts for discharge into said furnace through the respective discharge openings of said ducts; disposed in said chamber displaceably in the axial direction thereof, a closure member movable between a position of being retracted into said chamber and an operative position in which it closes and masks the discharge openings of said first and second ducts; and an actuating means operatively connected to said closure member for displacing same between its said operative and inoperative positions.

11. An assembly as set forth in claim 10 and further including means for producing oscillations of said closure member at least when said closure member is in said operative position.

12. An assembly as set forth in claim 11 wherein said oscillation generating mean comprises an ultrasonic oscillation generator.

13. In a metallurgical furnace having a wall structure providing an opening for injection of material into said furnace at a level above the level of a molten bath therein, a burner assembly which is operative to inject said material through said opening in the furnace wall and comprising: first means defining an elongate chamber; second means defining a duct for the feed of a said material through said opening in the wall of said furnace into the interior thereof, having a discharge opening for said material, which is at least substantially aligned with said furnace wall opening; in said chamber, a closure member displaceable between a first position in which it is retracted into said chamber and a second position in which it is partially extended from said chamber thereby to mask the discharge opening of said material-feed duct; and actuating means connected to said closure member for displacing same between said first and second positions thereof.

* * * * *